(12) United States Patent
Inoue

(10) Patent No.: US 10,442,006 B2
(45) Date of Patent: Oct. 15, 2019

(54) CUTTING INSERT, CUTTING TOOL, AND METHOD OF MANUFACTURING MACHINED PRODUCT USING THE SAME

(71) Applicant: Kyocera Corporation, Kyoto-shi, Kyoto (JP)

(72) Inventor: Yoshihiro Inoue, Omihachiman (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/738,149

(22) PCT Filed: Jun. 20, 2016

(86) PCT No.: PCT/JP2016/068259
§ 371 (c)(1),
(2) Date: Dec. 20, 2017

(87) PCT Pub. No.: WO2016/208536
PCT Pub. Date: Dec. 29, 2016

(65) Prior Publication Data
US 2018/0169767 A1    Jun. 21, 2018

(30) Foreign Application Priority Data
Jun. 23, 2015 (JP) ................................. 2015-125411

(51) Int. Cl.
*B23C 5/20* (2006.01)
*B23B 27/16* (2006.01)
(Continued)

(52) U.S. Cl.
CPC .......... *B23B 27/1611* (2013.01); *B23B 27/02* (2013.01); *B23B 27/065* (2013.01);
(Continued)

(58) Field of Classification Search
CPC .......... B23B 2200/08; B23B 2200/081; B23B 2200/087; B23B 2200/32; B23B 2200/321; B23B 2200/323; B23B 2200/325; B23B 2200/328; B23B 27/143; B23B 27/1607
See application file for complete search history.

(56) References Cited

U.S. PATENT DOCUMENTS 5,476,346 A * 12/1995 Lundstrom ........... B23B 27/143
407/114
5,577,867 A * 11/1996 Paya ..................... B23B 27/141
407/114
(Continued)

FOREIGN PATENT DOCUMENTS

JP    H08257837 A    10/1996
JP    2008213122 A    9/2008

OTHER PUBLICATIONS

International Search Report based on Application No. PCT/JP2016/068259 (2 Pages) dated Jul. 19, 2016.

*Primary Examiner* — Willmon Fridie, Jr.
(74) *Attorney, Agent, or Firm* — Viering, Jentschura & Partner MBB

(57) ABSTRACT

According to the present disclosure, a cutting insert includes an upper surface having a polygonal shape and includes a corner, a side surface adjacent to the upper surface, a cutting edge and a protrusion. The cutting edge is located at a ridge part in which the upper surface intersects with the side surface and includes a corner part located at the corner. The protrusion is located on the upper surface. The protrusion includes a first protrusion on a bisector of the corner in a top view. The protrusion further includes a second protrusion adjacent to the first protrusion in a direction orthogonal to the bisector. The second protrusion is closer to the corner than the first protrusion in the top view.

19 Claims, 11 Drawing Sheets

(51) Int. Cl.
*B23B 27/22* (2006.01)
*B23B 27/02* (2006.01)
*B23B 27/06* (2006.01)
*B23B 27/14* (2006.01)

(52) U.S. Cl.
CPC ........ *B23B 27/143* (2013.01); *B23B 27/1681* (2013.01); *B23B 27/1688* (2013.01); *B23B 27/22* (2013.01); *B23B 2200/049* (2013.01); *B23C 2200/0477* (2013.01)

(56) References Cited

U.S. PATENT DOCUMENTS

| | | | |
|---|---|---|---|
| 9,393,626 B2* | 7/2016 | Onodera | B23B 27/143 |
| 9,707,625 B2* | 7/2017 | Onodera | B23B 27/143 |
| 2009/0226269 A1* | 9/2009 | Iyori | B23B 27/143 |
| | | | 407/114 |
| 2011/0070039 A1* | 3/2011 | Park | B23B 27/141 |
| | | | 407/113 |
| 2012/0198973 A1* | 8/2012 | Schleinkofer | B23B 27/143 |
| | | | 82/117 |
| 2012/0275869 A1* | 11/2012 | Yamazaki | B23B 27/143 |
| | | | 407/115 |
| 2013/0064613 A1* | 3/2013 | Krishtul | B23B 27/143 |
| | | | 407/114 |
| 2015/0375303 A1* | 12/2015 | Fujii | B23B 27/143 |
| | | | 82/1.11 |
| 2016/0082518 A1* | 3/2016 | Sakai | B23B 27/143 |
| | | | 82/1.11 |

* cited by examiner

CUTTING INSERT, CUTTING TOOL, AND METHOD OF MANUFACTURING MACHINED PRODUCT USING THE SAME

RELATED APPLICATIONS

The present application is a national stage entry according to 35 U.S.C. § 371 of PCT application No.: PCT/JP2016/068259 filed on Jun. 20, 2016, which claims priority from Japanese application No.: 2015-125411 filed on Jun. 23, 2015 and is incorporated herein by reference in its entirety.

TECHNICAL FIELD

The present disclosure relates to a cutting insert for use in a threading process, a cutting tool, and a method of manufacturing a machined product using the cutting tool.

BACKGROUND ART

As an example of cutting inserts for use in the threading process, an indexable insert (cutting insert) described in Patent Document 1 has conventionally been known. The cutting insert described in Patent Document 1 includes a cutting edge located at a corner part of a major surface, a rake surface which is located along the cutting edge and has a protrusion disposed on the rake surface, and a saw tooth-shaped inclined surface located behind the rake surface. The inclined surface is inclined relative to a bisector of the cutting edge as a whole in a top view.

With a machining method, which is called radial infeed in the threading process, a chip flow is apt to be unstable. However, the above-mentioned inclined surface makes it easy to control a chip flow direction.

In the cutting insert described in Patent Document 1, the inclined surface is located behind the protrusion. Therefore, because a distance from the cutting edge to the inclined surface is long, the chip flow direction may become unstable before chips come into contact with the inclined surface. Thus, even with the cutting insert described in Patent Document 1, the control of the chip flow is not enough, and it may be difficult to control the chip flow direction through the inclined surface.

PRIOR ART DOCUMENT

Patent Document

Patent Document 1: Japanese Unexamined Patent Publication No. 8-257837

SUMMARY

In an embodiment, a cutting insert includes a polygonal-shaped upper surface, a side surface adjacent to the upper surface, a cutting edge and a protrusion. The cutting edge includes a corner part and is located at a ridge part in which the upper surface intersects with the side surface. The protrusion is located on the upper surface, and includes a first protrusion and a second protrusion. The first protrusion is located on a bisector of the corner part in a top view. The second protrusion is adjacent to the first protrusion in a direction orthogonal to the bisector in a top view. The second protrusion is closer to the corner part than the first protrusion in a top view.

In an embodiment, a cutting tool includes a holder and a cutting insert. The holder includes an insert pocket according to the present disclosure. The cutting insert is attached to the insert pocket and the cutting edge protrudes outward beyond the holder.

In an embodiment, a method of manufacturing a machined product includes: rotating a workpiece; bringing the cutting edge in a cutting tool according to the present disclosure into contact with the workpiece being rotated; and separating the cutting tool from the workpiece.

EMBODIMENTS

Figure 1:
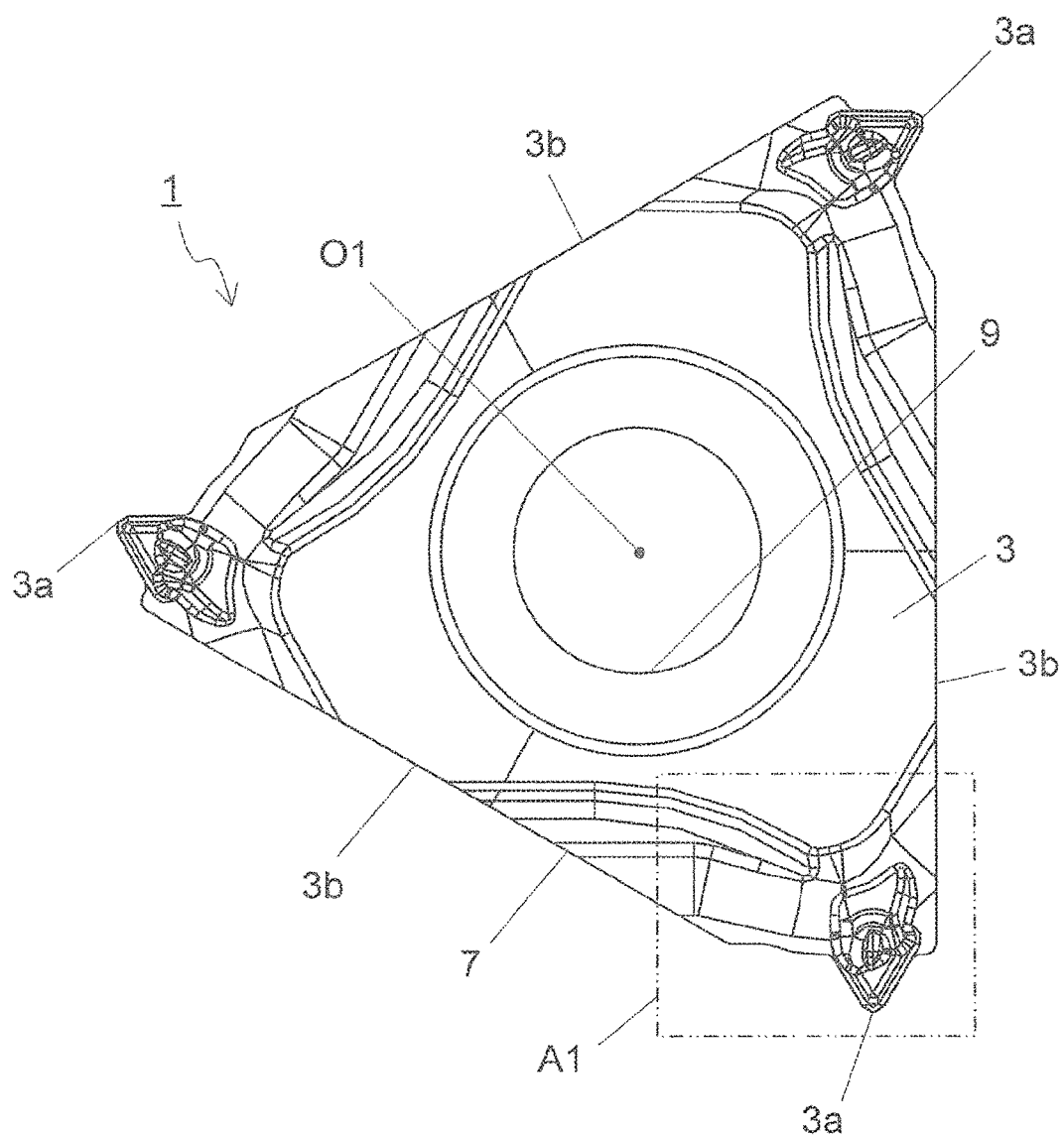
FIG. 1 is a top view showing a cutting insert according to an embodiment of the present disclosure.

A cutting insert according to an embodiment of the present disclosure is described in detail below with reference to the drawings. For convenience of description, the drawings referred to in the following show, in a simplified form, main components among components constituting the present embodiment, which are necessary for describing the present embodiment. Therefore, the cutting insert of the present disclosure may include any arbitrary component not shown in the drawings referred to. Dimensions of the components in the drawings are given by way of example of the cutting insert of the present disclosure. Therefore, the cutting insert of the present disclosure is not limited to the dimensions of the components in the drawings.

<Cutting Insert>

The cutting insert 1 (hereinafter also referred to simply as "insert 1") according to an embodiment of the present disclosure is described below with reference to FIGS. 1 to 13. As shown in FIG. 1, the insert 1 of the present embodiment is an insert having a triangular plate shape which is applicable to the threading process.

Specifically, the insert 1 includes a first major surface 3 having a triangular shape, a second major surface located on the opposite side of the first major surface 3, and a side surface 7 located between the first major surface 3 and the second major surface. The first major surface 3 may be replaced with the upper surface 3 because the first major surface 3 is a surface along which chips mostly flow during the threading process, and which is located on an upper side in the insert 1. The first major surface 3 is replaced with the upper surface 3 in the present embodiment, without being limited thereto. The first major surface 3 is servable as a lower surface by being located on a lower side in the insert 1 depending on usage environment of the insert 1.

The upper surface 3 has a polygonal shape with a plurality of corners and a plurality of sides 3b. The upper surface 3 in the present embodiment has a triangular shape. Therefore, the upper surface 3 in the present embodiment has the three corners and the three sides 3b.

The second major surface may be replaced with a lower surface because the second major surface is located on the opposite side of the first major surface 3 and located on the lower side in the insert 1. A part of the lower surface functions as a seating surface attached to a holder described later when the insert 1 is attached to the holder. The part of the lower surface which functions as the seating surface has a flat planar shape (flat surface). It is therefore possible to evaluate a height position of the upper surface 3 on the basis of the flat surface in the present embodiment. The lower surface in the present embodiment has a triangular shape which is the same as the upper surface 3, and is overlapped with the upper surface 3 in a top view. The term "a top view" denotes a state in which the insert 1 is viewed toward the upper surface 3.

Here, the term "polygonal shape" does not mean a precise polygonal shape. For example, each of the corners of the upper surface 3 in the present embodiment is not made into a precise corner. Each of the sides 3b located so as to connect the corners adjacent to each other need not be made into a precise straight line shape.

The shapes of the upper surface 3 and the lower surface are not limited to those in the foregoing embodiment. Although the shape of the upper surface 3 in a top view is an approximately triangular shape in the insert 1 of the present embodiment, the shape of the upper surface 3 in the top view may be a polygonal shape, such as a rectangular shape or a pentagonal shape.

The side surface 7 is located between the first major surface 3 (upper surface 3) and the second major surface (lower surface), and is adjacent to each of the upper surface 3 and the lower surface. The side surface 7 is made up of three surface regions so as to correspond to the three sides of each of the triangular upper surface 3 and the triangular lower surface. The side surface 7 functions as a so-called flank surface when a cutting process of a workpiece is carried out using the insert 1 of the present embodiment.

The insert 1 of the present embodiment includes a through hole 9 extending from the center of the upper surface 3 toward the center of the lower surface. The through hole 9 is disposed for the purpose of inserting a fixing screw when the insert 1 is screwed into the holder of the cutting tool. A central axis O1 of the through hole 9 coincides with an imaginary straight line passing through the center of the upper surface 3 and the center of the lower surface. The central axis O1 of the through hole 9 also coincides with a central axis of the insert 1. Therefore, the central axis O1 of the through hole 9 may be replaced with the central axis of the insert 1. The term "the central axis of the insert 1" denotes an axis which passes through between the upper surface 2 and the lower surface, and serves as a rotation axis when the insert 1 is rotated in a top view.

As shown in FIGS. 5 to 13, the side surface 7 is formed so as to have a straight line shape in a cross section parallel to the central axis O1 of the through hole 9. On this occasion, because the lower surface has the same shape as the upper surface 3, the side surface 7 is parallel to the central axis O1 in a cross section parallel to the central axis O1.

In a top view of the upper surface 3 of the insert 1 of the present embodiment, a length of a single side is, for example, 10-25 mm, and a height from the lower surface to the upper surface 3 is, for example, 2-8 mm. The term "height from the lower surface to the upper surface 3" denotes a dimension in a direction parallel to the central axis O1 in between an upper end of the upper surface 3 and a lower end of the lower surface.

As a material of the insert 1, there is, for example, cemented carbide or cermet. As a composition of the cemented carbide, there are, for example, WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of each of the above components constituting the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Figure 2:
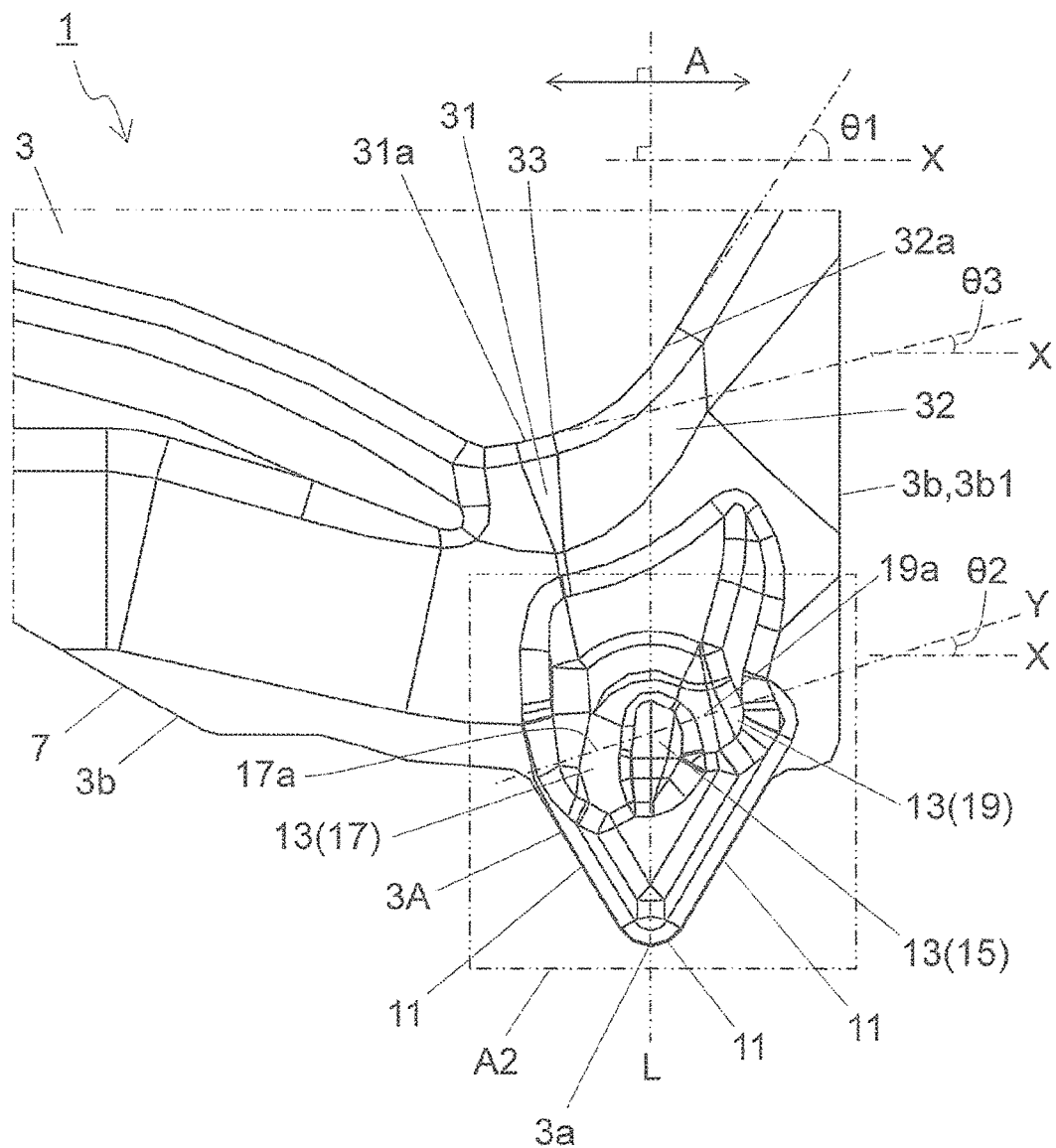
FIG. 2 is an enlarged view showing in an enlarged dimension a region A1 in the cutting insert shown in FIG. 1.
Figure 3:
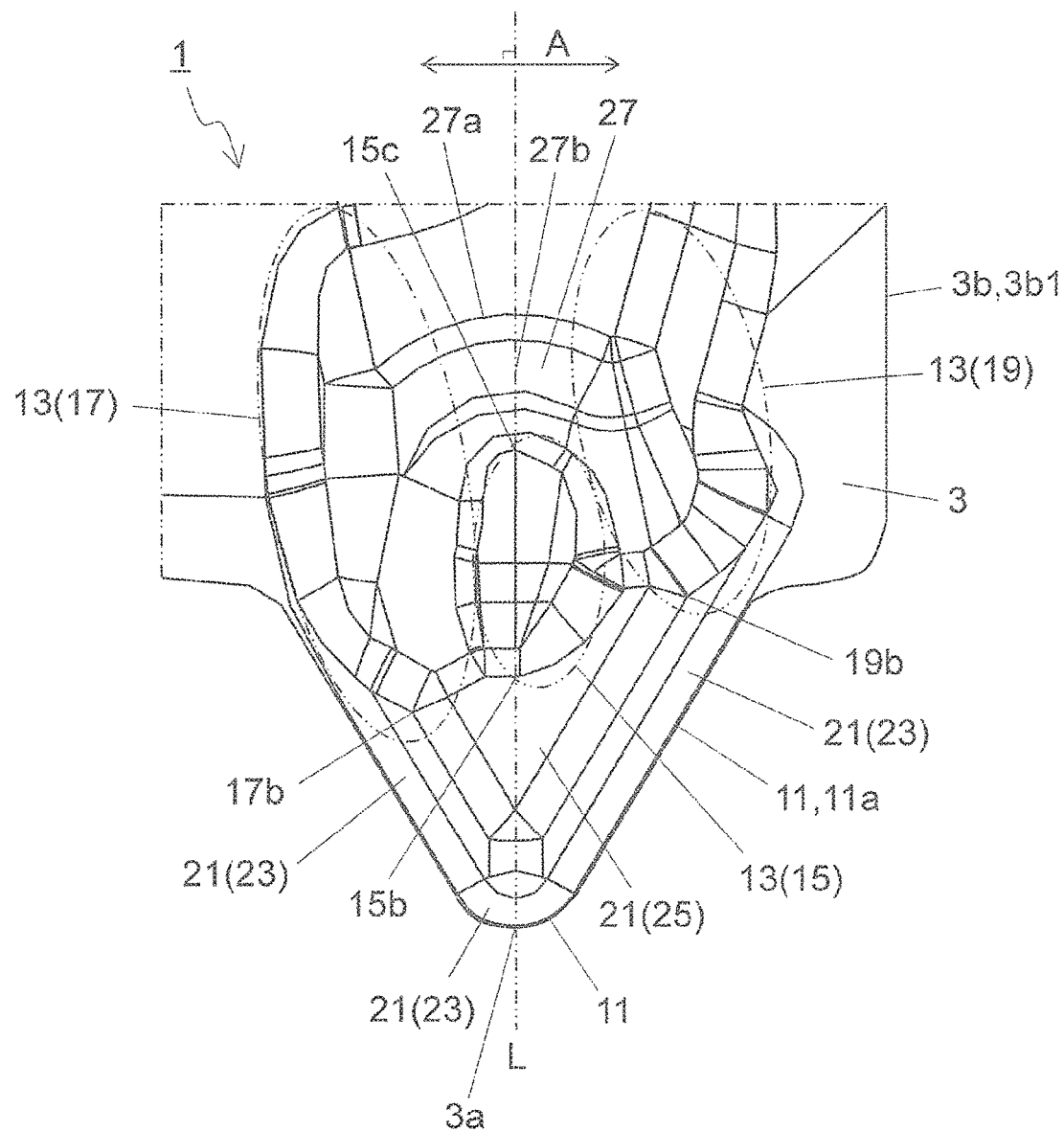
FIG. 3 is an enlarged view showing in a further enlarged dimension a region A2 in the cutting insert shown in FIG. 2.
Figure 4:
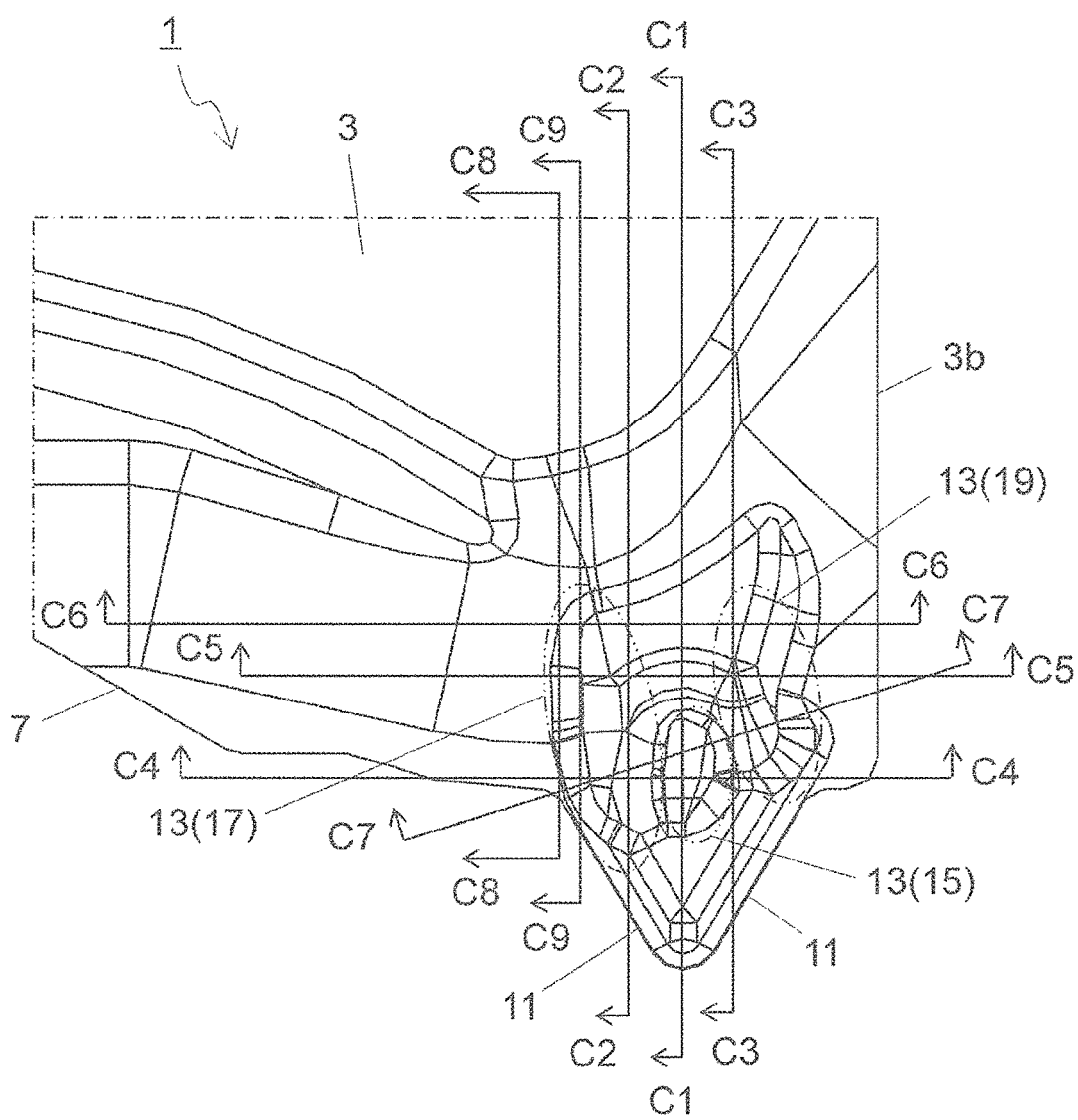
FIG. 4 is a top view showing the same region as in the cutting insert shown in FIG. 2.

A corner part 3a of the upper surface 3 in the present embodiment is not formed merely by extending the two sides 3b adjacent to each other with respect to the corner part 3a. As shown in FIGS. 2 and 3, the corner part 3a protrudes toward a direction along one of the two sides 3b adjacent to each other in a top view (hereinafter referred to as a first side 3b1). Therefore, a bisector L of the corner part 3a is parallel to the first side 3b1 in a top view. In the present embodiment, the corner part 3a denotes a tip portion of an approximately triangular shaped region 3A protruding from the two sides 3b adjacent to each other as shown in FIG. 2.

The insert 1 includes a cutting edge 11 which includes the corner part 3a and is located at a ridge part in which the upper surface 3 intersects with the side surface 7. Specifically, the cutting edge 11 is formed at the ridge part in which the corner part 3a of the upper surface 3 intersects with the side surface 7. That is, the cutting edge 11 is located so as to include the corner part 3a. The cutting edge 11 is used for cutting a workpiece during the cutting process. A so-called honing process may be applied to a part of a region in which the upper surface 3 intersects with the side surface 7, and in which the cutting edge 11 is formed. When an intersection region of the upper surface 3 and the side surface 7 is already subjected to the honing process by which this region becomes a curved surface shape, strength of the cutting edge 11 is less likely to degrade. Examples of the horning process include round honing.

The upper surface 3 in the present embodiment is provided with a protrusion 13. In other words, the insert 1 includes the protrusion 13 located on the upper surface 3. The protrusion 13 is located more inside than the cutting edge 11 on the upper surface 3. The protrusion 13 is located in a flow direction of chips generated at the cutting edge 11, and is used for controlling the flow of the chips. Specifically, the protrusion 13 has a role in curving the chips or controlling the chip flow direction.

Figure 16:
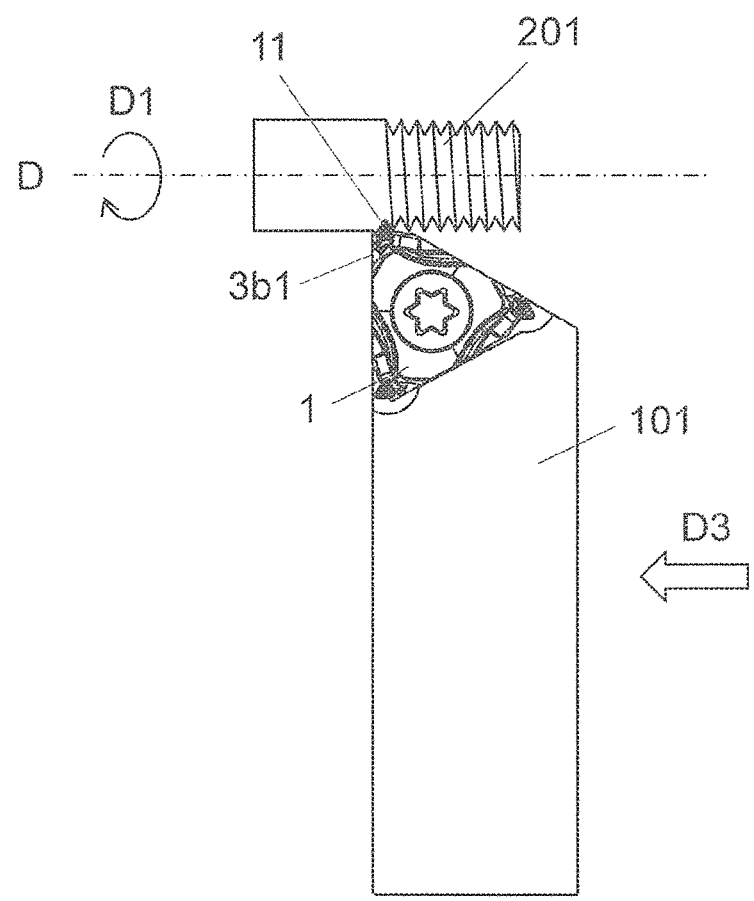
FIG. 16 is a schematic diagram showing a step in the method of manufacturing a machined product according to the embodiment of the present disclosure.

The protrusion 13 in the present embodiment includes a first protrusion 15, a second protrusion 17, and a third protrusion 19. The first protrusion 15, the second protrusion 17, and the third protrusion 19 are located side by side in a top view. More specifically, the third protrusion 19, the first protrusion 15, and the second protrusion 17 are located side by side in this order from a side close to the first side 3b1. The first side 3b1 is one of the two sides 3b adjacent to each other which is located on a forward side in a feed direction of the cutting tool 101 indicated by an arrow D3 as shown in FIG. 16 described later. Therefore, the first protrusion 15, the second protrusion 17, and the third protrusion 19 are located side by side from the forward side in the feed direction of the cutting tool 101 in the order of the third protrusion 19, the first protrusion 15, and the second protrusion.

The first protrusion 15, the second protrusion 17, and the third protrusion 19 are located as follows in a top view. As shown in FIGS. 2 and 3, the first protrusion 15 is located on the bisector L of the corner part 3a. Each of the second protrusion 17 and the third protrusion 19 is adjacent to the first protrusion 15 in a direction of a double headed arrow A orthogonal to the bisector L. Here, the second protrusion 17 and the third protrusion 19 are adjacent to each other with the first protrusion 15 interposed therebetween. In other words, the first protrusion 15 is located between the second protrusion 17 and the third protrusion 19 in the direction of the double headed arrow A orthogonal to the bisector L.

The second protrusion 17 in the present embodiment is closer to the corner part 3a than the first protrusion 15 in a top view. In other words, a tip 17b of the second protrusion 17 is closer to the corner part 3a than a tip 15b of the first protrusion 15 as shown in FIG. 3. More specifically, the tip 17b of the second protrusion 17 is closer to the corner part 3a than the tip 15b of the first protrusion 15 and a tip 19b of the third protrusion 19. This configuration makes it possible to stably treat chips in the threading process, such as radial infeed and flank infeed. The term "being close to the corner part 3a" denotes having a small distance to the corner part 3a in a direction along the bisector L. For the sake of convenience, a side approaching the corner 3a in the direction along the bisector L is referred to as "a front end side," and a side departing from the corner part 3a is referred to as "a rear end side" in the following description.

A machining method, such as radial infeed or flank infeed, is employed in the threading process. For example, when the process is carried out by radial infeed, chips start to move forward in the direction along the bisector L. On this occasion, the tip 17b of the second protrusion 17 is closer to the corner part 3a than the tip 15b of the first protrusion 15. Therefore, the flow direction of the chips is controllable through the second protrusion 17. Specifically, the flow direction of the chips that has flown along the bisector L is easily controllable into a direction toward a side closer to the location of the third protrusion 19 than the bisector L, namely, toward the rear side in the feed direction. This leads to stable treatment of the chips.

When the process is carried out by flank infeed, the stable treatment of chips is achievable because of the presence of the first protrusion 15 and the second protrusion 17. Specifically, the cutting process is carried out by flank infeed by using mainly a part of a segment 11a of the cutting edge 11 which is formed at a straight line-shaped peripheral edge adjacent to the tip of the corner part 3a. The second protrusion 17 is not located on the bisector L, and is adjacent to the first protrusion 15 being located on the bisector L, on a side departing from the segment 11a of the cutting edge 11. Accordingly, the second protrusion 17 is located far away from the segment 11a of the cutting edge 11, whereas the first protrusion 15 is located at a position closer to the segment 11a of the cutting edge 11 than the second protrusion 17. Hence, besides the second protrusion 17, the first protrusion 15 is also capable of treating the chips. Consequently, the chip flow is stably controllable even in the flank infeed.

Further in the present embodiment, the first protrusion 15 is closer to the corner part 3a than the third protrusion 19 in a top view. Specifically, the tip 15b of the first protrusion 15 is closer to the corner part 3a than the tip 19b of the third protrusion 19 in the top view. Therefore, when the process is carried out by radial infeed, the flow direction of chips that has flown along the bisector L is easily controllable in a direction toward a side closer to the location of the third protrusion 19 than the bisector L, namely, toward the rear side in the feed direction.

When the process is carried out by flank infeed, the third protrusion 19 is located at a position closer to the segment 11a of the cutting edge 11 than the first protrusion 15. Therefore, besides the first protrusion 15 and the second protrusion 17, the third protrusion 19 is also capable of treating chips. Consequently, the chip flow is more stably controllable even in the flank infeed.

Figure 5:
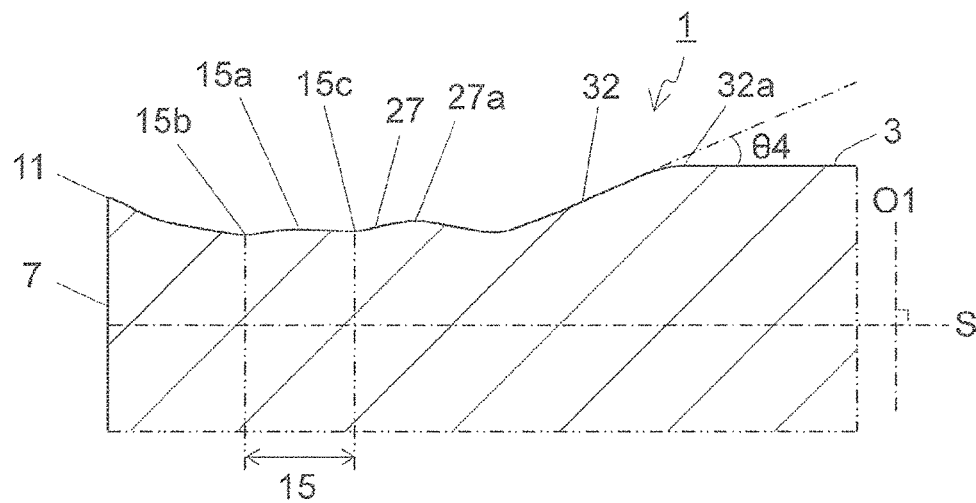
FIG. 5 is a sectional view of a cross section taken along line C1-C1 in the cutting insert shown in FIG. 4.
Figure 6:
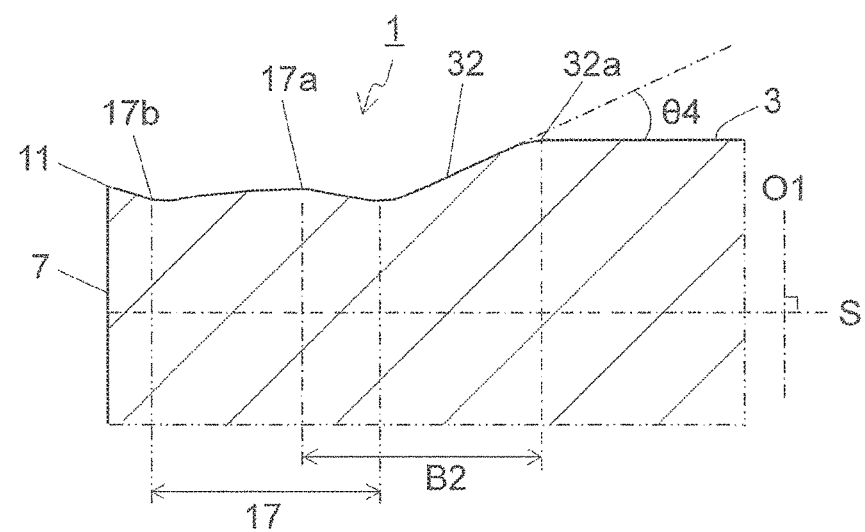
FIG. 6 is a sectional view of a cross section taken along line C2-C2 in the cutting insert shown in FIG. 4.
Figure 7:
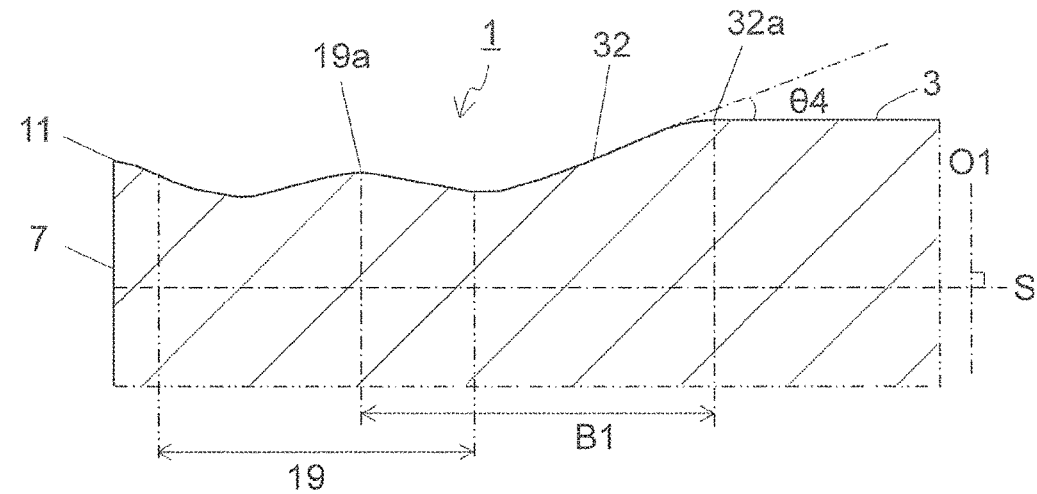
FIG. 7 is a sectional view of a cross section taken along line C3-C3 in the cutting insert shown in FIG. 4.

Each of the second protrusion 17 and the third protrusion 19 in the present embodiment protrudes further upward than the first protrusion 15. In other words, the second protrusion 17 is taller than the first protrusion 15. Each of the second protrusion 17 and the third protrusion 19 is taller than the first protrusion 15. More specifically, as shown in FIGS. 5 to 7, each of a top 17a of the second protrusion 17 and a top 19a of the third protrusion 19 is taller than a top 15a of the first protrusion 15. A height of the top of each of the first protrusion 15, the second protrusion 17, and the third protrusion 19 can be evaluated by a front end view of the insert 1, a side view of the insert 1, or a sectional view of the insert 1 in a cross section orthogonal to the lower surface. The term "top" denotes a portion of each of the protrusions 13 which has the greatest height. The term "a front end view" denotes a state in which the insert 1 is viewed in a direction toward the side surface 7 having the corner part 3a located thereon. The term "a side view" denotes a state in which the insert 1 is viewed in a direction toward the side surface 7. Even when evaluated in any one of the front end view, the side view, and the sectional view, the evaluation can be made, for example, on the basis of the flat surface on the lower surface. The above-mentioned cross section is also a cross section parallel to the central axis O1. Therefore, when the height of each of the first protrusion 15, the second protrusion 17, and the third protrusion 19 is evaluated in the cross section as shown in FIGS. 5 to 7, the evaluation may be made on the basis of any arbitrary plane S perpendicular to the central axis O1.

When each of the second protrusion 17 and the third protrusion 19 protrudes further upward than the first protrusion 15, chips easily flow, across the first protrusion 15, in a direction from the second protrusion 17 toward the third protrusion 19. This further facilitates the control of the chip flow.

The upper surface 3 in the present embodiment includes a recess 21 located along the cutting edge 11 as shown in FIG. 3. Specifically, the upper surface 3 includes the recess 21 made up of a rake surface 23 and a bottom surface 25. The rake surface 23 is an inclined surface which is located along the cutting edge 11 and whose height decreases as going away from the cutting edge 11. The rake surface 23 has a function of scooping up chips generated at the cutting edge 11. The bottom surface 25 is a flat surface located more inside than the rake surface 23.

The tip 15b of the first protrusion 15, the tip 17b of the second protrusion 17, and the tip 19b of the third protrusion 19 are located at the recess 21. The term "the tip of each of the first protrusion 15, the second protrusion 17, and the third protrusion 19" in the present embodiment denotes a portion closest to the corner part 3a in the direction along the bisector L in a top view. When the first protrusion 15, the second protrusion 17, and the third protrusion 19 are so located, it is possible to decrease the height of the tip of each of the first protrusion 15, the second protrusion 17, and the third protrusion 19. It is therefore possible to increase a difference in height between the tip and the top of these protrusions. This ensures that the chips are stably brought into contact with the first protrusion 15, the second protrusion 17, and the third protrusion 19.

As described above, both of the second protrusion 17 and the third protrusion 19 protrude further upward than the first protrusion 15. Here, the first protrusion 15 is positioned lower than the cutting edge 11 as shown in FIG. 5. In other words, the top 15a of the first protrusion 15 is positioned lower than the cutting edge 11. Therefore, the first protrusion 15 is unobservable in a front end view or a side view of the insert 1.

Figure 11:
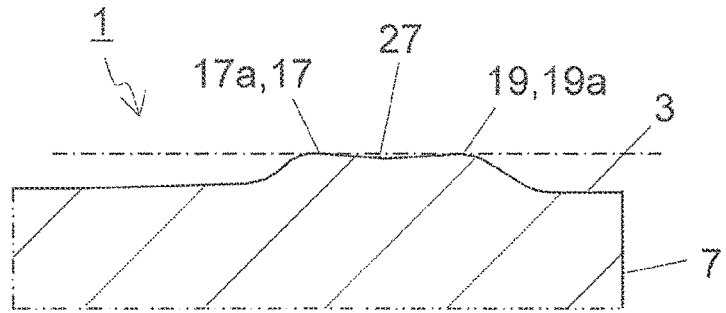
FIG. 11 is a sectional view of a cross section taken along line C7-C7 in the cutting insert shown in FIG. 4.
Figure 12:
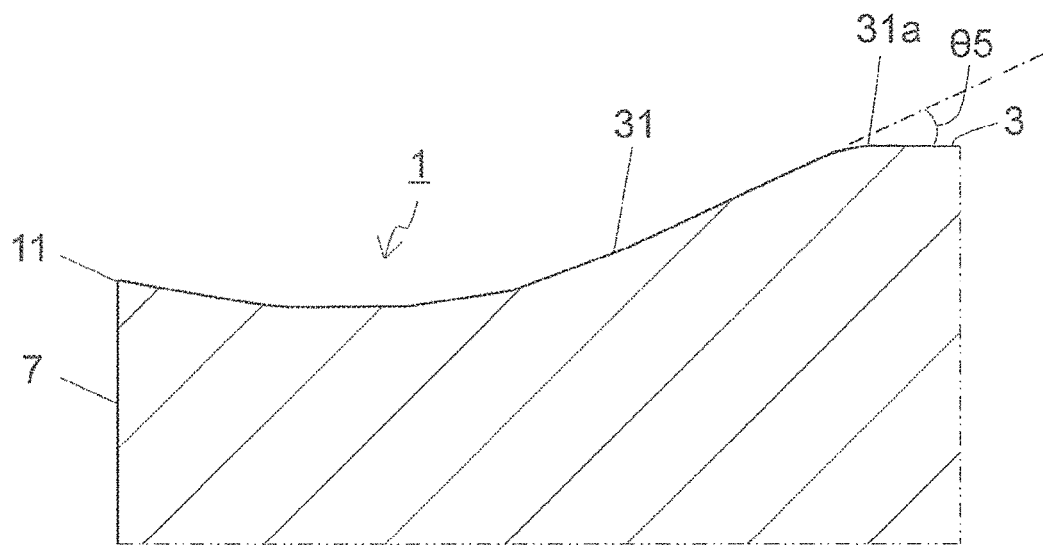
FIG. 12 is a sectional view of a cross section taken along line C8-C8 in the cutting insert shown in FIG. 4.
Figure 13:
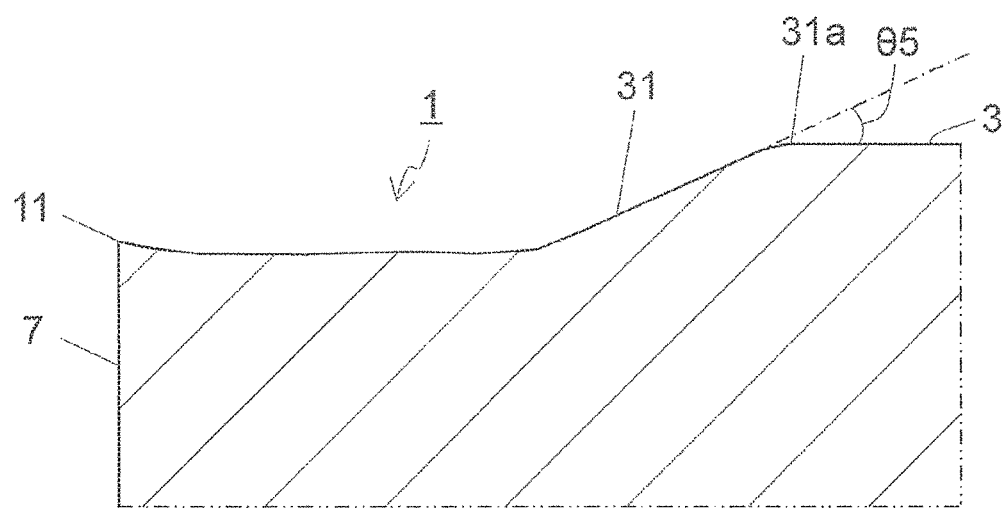
FIG. 13 is a sectional view of a cross section taken along line C9-C9 in the cutting insert shown in FIG. 4.

The height of the second protrusion 17 is the same as the height of the third protrusion 19 as shown by a dot-and-dash line in FIG. 11. More specifically, the height of the top 17a of the second protrusion 17 is the same as the height of the top 19a of the third protrusion 19. The phrase "the height of the second protrusion 17 is the same as the height of the third protrusion 19" denotes that both need to have substantially the same heights and there may be a slight difference between both height values. For example, there may be a difference corresponding to ±3% of thickness of the insert 1 between both height values.

As shown in FIG. 3, both of the second protrusion 17 and the third protrusion 19 extend further inside the upper surface 3 than the first protrusion 15 in a top view. More specifically, both of the second protrusion 17 and the third protrusion 19 extend further inside the upper surface 3 than a rear end 15c of the first protrusion 15 in the top view. That is, a part of each of the second protrusion 17 and the third protrusion 19 is located closer to a rear end of the upper surface 3 than the rear end 15c of the first protrusion 15. Thereby, the flow of chips, which has flown, while passing over the first protrusion 15, in a direction from the cutting edge 11 toward the second protrusion 17 and the third protrusion 19, is stably controllable through the second protrusion 17 and the third protrusion 19.

The second protrusion 17 and the third protrusion 19 in the present embodiment connect to each other on a rear end side than the first protrusion 15. Specifically, a wall surface part 27 that connects the second protrusion 17 and the third protrusion 19 is located on the rear end side than the first protrusion 15. In other words, the upper surface 3 includes the wall surface part 27 which is located further inside than the second protrusion 17 and the third protrusion 19, and which connects to each of the second protrusion 17 and the third protrusion 19. As shown in FIG. 5, the wall surface part 27 is located on the rear end side than the first protrusion 15, and the height thereof increases toward the rear end side. By the presence of the wall surface part 27, even when a chip with a small width has climbed over the first protrusion 15, the chip flow direction is controllable through the wall surface part 27.

An upper end 27a of the wall surface part 27 is taller than the top 15a of the first protrusion 15 in the present embodiment. This makes it possible to stably bring the chip that has climbed over the first protrusion 15 into contact with the wall surface part 27. Therefore, the chip flow direction is stably controllable through the wall surface part 27.

Furthermore, a part of the wall surface part 27 which is located on the bisector L in a top view is made into such a concave shape that is recessed toward the rear end side of the upper surface 3. In other words, the wall surface part 27 includes a recess 27b which is located on the bisector L and recessed toward the inside the upper surface 3 in the top view. Thus, when the wall surface part 27 includes the recess 27b, it is possible to decrease a contact area when a chip having a large width comes into contact with the wall surface part 27. It is therefore possible to reduce the likelihood of occurrence of the problem that the wall surface part 27 is worn out or the chip flow is disrupted.

Figure 8:
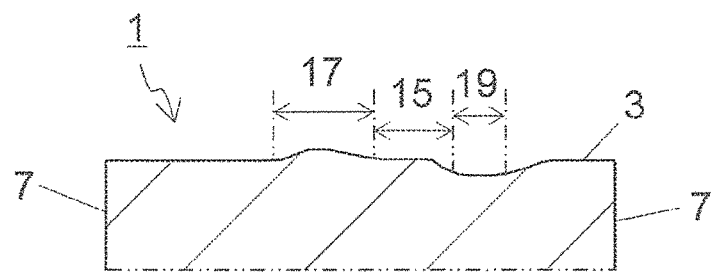
FIG. 8 is a sectional view of a cross section taken along line C4-C4 in the cutting insert shown in FIG. 4.
Figure 9:
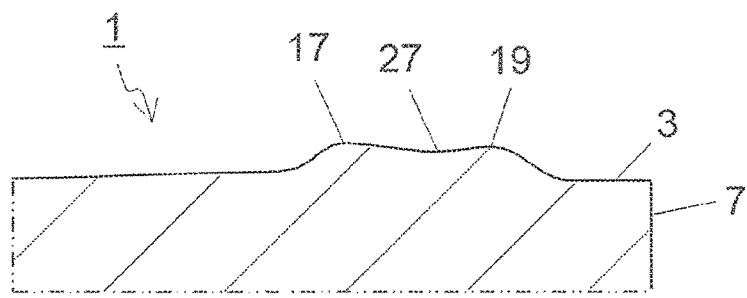
FIG. 9 is a sectional view of a cross section taken along line C5-C5 in the cutting insert shown in FIG. 4.
Figure 10:
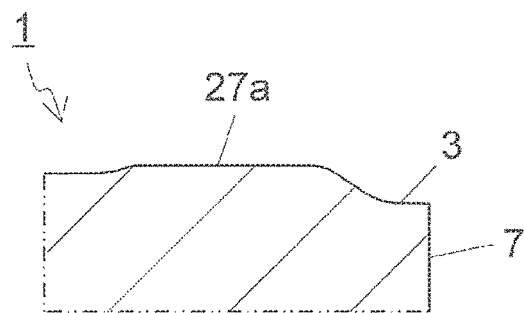
FIG. 10 is a sectional view of a cross section taken along line C6-C6 in the cutting insert shown in FIG. 4.

As shown in FIGS. 3 and 8, the first protrusion 15, the second protrusion 17, and the third protrusion 19 in the present embodiment do not exist independently of one another, but are located so as to connect to each other. That is, it can also be rephrased that in the insert 1 of the present embodiment, a single protrusion includes a first region corresponding to the first protrusion 15, a second region corresponding to the second protrusion 17, and a third region corresponding to the third protrusion 19.

Meanwhile in the present embodiment, as shown in FIGS. 2, 5 to 7, and 12 and 13, the upper surface 3 further includes a first surface 31 and a second surface 32 which are located more inside than the protrusion 13 and are inclined upward as going away from the corner part 3a. As shown in FIG. 2, the first surface 31 and the second surface 32 are located in this order from a side close to the second protrusion 17 in the double headed arrow A orthogonal to the bisector L in a top view. An upper edge 32a of the second surface 32 is inclined so as to separate from the corner part 3a as going from the second protrusion 17 side toward the third protrusion 19 side in the double headed arrow A orthogonal to the bisector L in a top view. An angle θ1 formed by the upper edge 32a of the second surface 32 and a straight line X orthogonal to the bisector L is larger than an angle θ2 formed by the straight line X and an imaginary straight line Y connecting the top 17a of the second protrusion 17 and the top 19a of the third protrusion 19 in a top view. With these configurations, even when a chip has climbed over the protrusion 13, the chip flow direction is stably controllable into a direction toward the third protrusion 19 by the second surface 32. The imaginary straight line Y is a straight line corresponding to the line C7-C7 in FIG. 4. The angle θ1 is, for example, 45-75°. The angle θ2 is, for example, 5-20°.

As shown in FIGS. 6 and 7, a distance B1 between the top 19a of the third protrusion 19 and the upper edge 32a of the second surface 32 is larger than a distance B2 between the top 17a of the second protrusion 17 and the upper edge 32a of the second surface 32 in the direction parallel to the bisector L. With this configuration, the flow direction of the chip that has climbed over the protrusion 13 is more stably controllable into a direction toward the third protrusion 19 by the second surface 32. The distance B1 is, for example, 0.8-2.5 mm. The distance B2 is, for example, 0.5-2.25 mm.

As shown in FIGS. 5 to 7, each of the first protrusion 15, the second protrusion 17, and the third protrusion 19 is positioned lower than the upper edge 32a of the second surface 32. With this configuration, the chip that has climbed over the protrusion 13 can be stably brought into contact with the second surface 32.

As shown in FIG. 2, an upper edge 31a of the first surface 31 is inclined so as to separate from the corner part 3a as going from the second protrusion 17 side toward the third protrusion 19 side in the double headed arrow A orthogonal to the bisector L in a top view. An angle θ3 formed by the upper edge 31a of the first surface 31 and the straight line X is equal to the angle θ2 in a top view. With these configurations, the chip that has climbed over the protrusion 13 easily flows in a direction from the first surface 31 toward the second surface 32. Similarly to the angle θ2, the angle θ3 is, for example, 5-20°. The phrase "the angle θ3 is equal to the angle θ2" denotes that both values need to be substantially the same and there may be a difference of ±5° between both values.

As shown in FIGS. 5 to 7, and 12 and 13, each of the first protrusion 15, the second protrusion 17, and the third protrusion 19 is positioned lower than the upper edge 31a of the first surface 31. With this configuration, when the chip that has climbed over the protrusion 13 flows toward the first surface 31, it is possible to stably bring the chip into contact with the first surface 31.

As shown in FIGS. 5 to 7, and 12 and 13, an inclination angle θ4 of the second surface 32 decreases, and an inclination angle θ5 of the first surface 31 is constant as going from the second protrusion 17 side toward the third protrusion 19 side in the double headed arrow A orthogonal to the bisector L. With this configuration, the flow direction of the chip that has climbed over the protrusion 13 is stably controllable into the direction from the first surface 31 side toward the second surface 32 side, and a space over which chips flow can be made larger toward the front in the chip flow direction by the first surface 31 and the second surface 32. Consequently, the chip that has climbed over the protrusion 13 easily flows in the direction from the first surface 31 side toward the second surface 32 side, thereby further enhancing chip discharge performance. The inclination angle θ4 is, for example 15-45°. The inclination angle θ5 is, for example 25-40°.

The first surface 31 and the second surface 32 connect to each other in the present embodiment as shown in FIG. 2. The inclination angle θ4 is equal to the inclination angle θ5 at a boundary part 33 between the first surface 31 and the second surface 32. With these configurations, the chip that has climbed over the protrusion 13 easily flows in the direction from the first surface 31 side toward the second surface 32 side. The phrase "the inclination angle θ4 is equal to the inclination angle θ5" denotes that both values need to be substantially the same and there may be a difference of ±5° between both values. Alternatively, any surface other than the first surface 31 and the second surface 32 may be located between the first surface 31 and the second surface 32.

An area of the second surface 32 is larger than an area of the first surface 31 in the present embodiment as shown in FIG. 2. With this configuration, the flow direction of the chip that has climbed over the protrusion 13 is stably controllable mainly through the second surface 32, and the wide space over which chips flow is obtainable.

<Cutting Tool>

The cutting tool 101 according to an embodiment of the present disclosure is described below with reference to the drawings.

Figure 14:
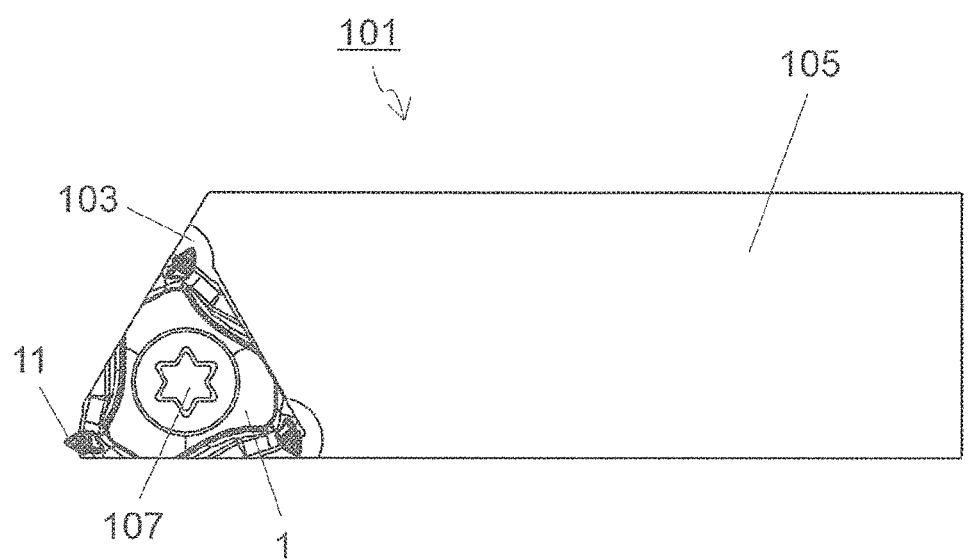
FIG. 14 is a top view showing a cutting tool according to an embodiment of the present disclosure.

As shown in FIG. 14, the cutting tool 101 of the present embodiment includes a holder 105 having on a front end side thereof an insert pocket 103 (hereinafter also referred to simply as "the pocket 103"), and an insert 1 being mounted on the pocket 103. Here, the insert 1 is attached to the pocket 103 so that at least the cutting edge 11 protrudes beyond a front end of the holder 105, in other words, the cutting edge 11 protrudes outward beyond the holder 105.

The holder 105 in the present embodiment is a bar shape extending in an elongated form. A pocket 103 is disposed close to the front end of the holder 105. The pocket 103 is a part which is adapted to attach the insert 1 thereto, and opens into a front end surface of the holder 105.

The insert 1 is fixed to the holder 105 in the following manner. The pocket 103 is provided with a screw hole (not shown). The insert 1 is disposed at the pocket 103 so that the through hole 9 of the insert 1 is located coaxially with the screw hole. A fixing screw 107 is inserted into the through hole 9 of the insert 1, and is also fixed to the screw hole of the pocket 103. Thus, the insert 1 is fixable to the holder 105.

As a material of the holder 105, for example, steel and cast iron are usable. Of these materials, steel having high rigidity is particularly preferable.

<Method of Manufacturing Machined Product>

The method of manufacturing a machined product according to an embodiment of the present disclosure is described below with reference to the drawings.

The machined product is manufacturable by subjecting a workpiece 201 to a cutting process. As the cutting process, the threading process is exemplified in the present embodiment. The method of manufacturing the machined product according to the present embodiment includes the following steps:

(1) rotating of the workpiece 201;

(2) bringing at least the cutting edge 11 of the cutting tool 101 represented by the foregoing embodiment into contact with the workpiece 201 being rotated; and (3) separating the cutting tool 101 from the workpiece 201.

Figure 15:
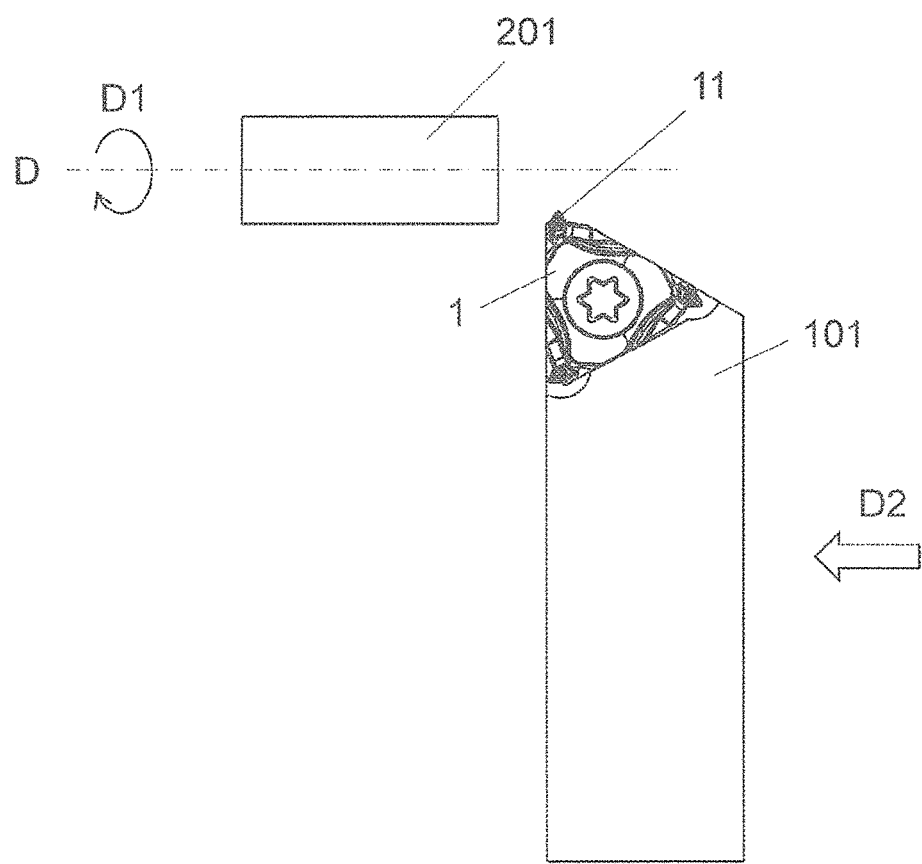
FIG. 15 is a schematic diagram showing a step in a method of manufacturing a machined product according to an embodiment of the present disclosure.
Figure 17:
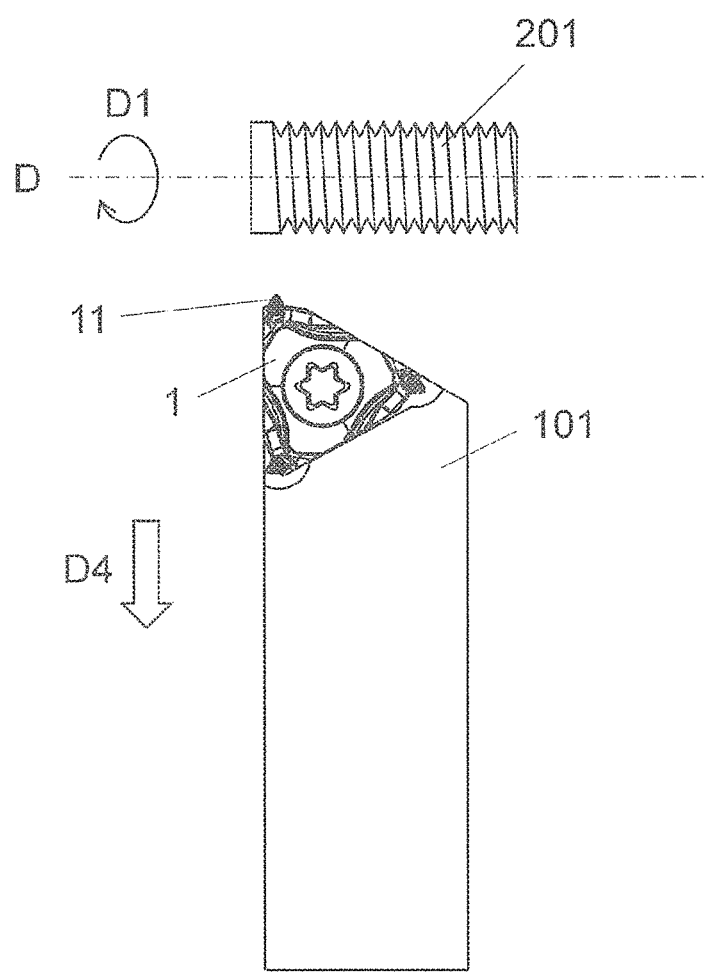
FIG. 17 is a schematic diagram showing a step in the method of manufacturing a machined product according to the embodiment of the present disclosure.

More specifically, firstly, the workpiece 201 is rotated in D1 direction around an axis D as shown in FIG. 15. The cutting tool 101 is brought relatively near the workpiece 201 by moving the cutting tool 101 in D2 direction. Then, the workpiece 201 is cut by bringing the cutting edge 11 of the cutting tool 101 into contact with the workpiece 201 as shown in FIG. 16. Here, a screw groove is formed by cutting the workpiece 201 while moving the cutting tool 101 in D3 direction. Thereafter, the cutting tool 101 is kept relatively away from the workpiece 201 by moving the cutting tool 101 in D4 direction as shown in FIG. 17.

In the present embodiment, the cutting tool 101 is brought near the workpiece 201 in a state in which the axis D is fixed and the workpiece 201 is rotated. In FIG. 16, the workpiece 201 is cut by bringing the cutting edge 11 of the insert 1 into contact with the workpiece 201 being rotated. In FIG. 17, the cutting tool 101 is kept away in a state in which the workpiece 201 is rotated.

In the cutting process using the manufacturing method of the present embodiment, the cutting tool 101 is brought into contact with the workpiece 201, or the cutting tool 101 is kept away from the workpiece 201 by moving the cutting tool 101 in each of the steps. It is to be understood, however, that there is no intention to limit the manufacturing method to this embodiment.

For example, in the step (1), the workpiece 201 may be brought near the cutting tool 101. Similarly, in the step (3), the workpiece 201 may be kept away from the cutting tool 101. When the cutting process is continued, it is necessary to repeat the step of bringing the cutting edge 11 of the insert 1 into contact with different portions of the workpiece 201, while keeping the workpiece 201 rotated.

Examples of the material of the workpiece 201 include carbon steels, alloy steels, stainless steels, cast irons, and non-ferrous metals.

Although the embodiments according to the present disclosure have been illustrated and described above, the present disclosure is not limited to the foregoing embodiments. It is, of course, possible to make any arbitrary ones insofar as they do not depart from the gist of the present disclosure.

For example, each of the second protrusion 17 and the third protrusion 19 may protrude further upward than the cutting edge 11. In other words, each of the second protrusion 17 and the third protrusion 19 may be taller than the cutting edge 11. More specifically, each of the top 17a of the second protrusion 17 and the top 19a of the third protrusion 19 may be taller than the cutting edge 11. With this configuration, chips flowing in the direction from the cutting edge 11 toward the second protrusion 17 and the third protrusion 19 can be stably brought into contact with the second protrusion 17 and the third protrusion 19. Moreover, the chips easily flow, across the first protrusion 15, in the direction from a side of the second protrusion 17 toward a side of the third protrusion 19. The chip flow is consequently more easily controllable.

DESCRIPTION OF THE REFERENCE NUMERAL 1 cutting insert (insert)
3 first major surface (upper surface)
3A region
3a corner part
3b side
3b1 first side
7 side surface
9 through hole
11 cutting edge
11a segment
13 protrusion
15 first protrusion
15a top
15b tip
15c rear end
17 second protrusion
17a top
17b tip
19 third protrusion
19a top
19b tip
21 recess
23 rake surface
25 bottom surface
27 wall surface part
27a upper end
27b recess
31 first surface
31a upper edge
32 second surface
32a upper edge
33 boundary part
101 cutting tool
103 insert pocket (pocket)
105 holder
107 fixing screw
201 workpiece

What is claimed is:
1. A cutting insert, comprising:
an upper surface having a polygonal shape and comprising a corner;
a side surface adjacent to the upper surface;
a cutting edge located at a ridge part in which the upper surface intersects with the side surface and comprising a corner part located at the corner; and
a protrusion located on the upper surface, comprising:
a first protrusion located on a bisector of the corner in a top view;
a second protrusion adjacent to the first protrusion in a direction orthogonal to the bisector in the top view; and
a third protrusion; and
wherein
the second protrusion is closer to the corner than the first protrusion in the top view;
the first protrusion is located between the second protrusion and the third protrusion in the direction orthogonal to the bisector in the top view, and
the first protrusion is closer to the corner than the third protrusion in the top view.
2. The cutting insert according to claim 1, wherein the second protrusion is taller than the first protrusion.
3. The cutting insert according to claim 1, wherein each of the second protrusion and the third protrusion are taller than the first protrusion.
4. The cutting insert according to claim 1, wherein the upper surface comprises a recess located along the cutting edge, and
a tip of the first protrusion, a tip of the second protrusion, and a tip of the third protrusion are located at the recess.
5. The cutting insert according to claim 4, wherein the first protrusion is positioned lower than the cutting edge.
6. The cutting insert according to claim 1, wherein each of the second protrusion and the third protrusion extends toward more inside the upper surface than the first protrusion in the top view.
7. The cutting insert according to claim 1, wherein the upper surface further comprises a first surface and a second surface which are located more inside than the protrusion and which are inclined upward as going away from the corner,
the first surface and the second surface are located sequentially from a side close to the second protrusion in the direction orthogonal to the bisector in the top view,
an upper edge of the second surface is inclined and getting away from the corner as going from a second protrusion side toward a third protrusion side in the direction orthogonal to the bisector in the top view, and
an angle $\theta 1$ formed by the upper edge of the second surface and a straight line X orthogonal to the bisector is larger than an angle $\theta 2$ formed by the straight line X and an imaginary straight line connecting a top of the second protrusion and a top of the third protrusion in the top view.

8. The cutting insert according to claim 7, wherein a distance in a direction parallel to the bisector between the top of the third protrusion and the upper edge of the second surface is larger than a distance in a direction parallel to the bisector between the top of the second protrusion and the upper edge of the second surface.

9. The cutting insert according to claim 8, wherein each of the first protrusion, the second protrusion, and the third protrusion is positioned lower than the upper edge of the second surface.

10. The cutting insert according to claim 7, wherein an upper edge of the first surface is inclined and getting away from the corner as going from the second protrusion side toward the third protrusion side in the direction orthogonal to the bisector in the top view, and
an angle θ3 formed by the upper edge of the first surface and the straight line X is equal to the angle θ2 in the top view.

11. The cutting insert according to claim 10, wherein each of the first protrusion, the second protrusion, and the third protrusion is positioned lower than the upper edge of the first surface.

12. The cutting insert according to claim 7, wherein an inclination angle θ4 of the second surface decreases and an inclination angle θ5 of the first surface is constant as going from the second protrusion side toward the third protrusion side in the direction orthogonal to the bisector.

13. A cutting tool, comprising:
a holder comprising an insert pocket; and
a cutting insert according to claim 1, the cutting insert being attached to the insert pocket with the cutting edge protruding outward beyond the holder.

14. A method of manufacturing a machined product, comprising:
rotating a workpiece;
bringing the cutting edge in a cutting tool according to claim 13 into contact with the workpiece being rotated; and
separating the cutting tool from the workpiece.

15. A cutting insert, comprising:
an upper surface having a polygonal shape and comprising a corner;
a side surface adjacent to the upper surface;
a cutting edge located at a ridge part in which the upper surface intersects with the side surface and comprising a corner part located at the corner; and
a protrusion located on the upper surface, comprising:
a first protrusion located on a bisector of the corner in a top view; and
a second protrusion adjacent to the first protrusion in a direction orthogonal to the bisector in the top view, and
wherein
the second protrusion is closer to the corner than the first protrusion in the top view, and
the second protrusion is taller than the first protrusion.

16. The cutting insert according to claim 15, wherein the protrusion further comprises a third protrusion,
the first protrusion is located between the second protrusion and the third protrusion in the direction orthogonal to the bisector in the top view, and
the first protrusion is closer to the corner than the third protrusion in the top view.

17. The cutting insert according to claim 16, wherein each of the second protrusion and the third protrusion are taller than the first protrusion.

18. A cutting tool, comprising:
a holder comprising an insert pocket; and
a cutting insert according to claim 15, the cutting insert being attached to the insert pocket with the cutting edge protruding outward beyond the holder.

19. A method of manufacturing a machined product, comprising:
rotating a workpiece;
bringing the cutting edge in a cutting tool according to claim 18 into contact with the workpiece being rotated; and
separating the cutting tool from the workpiece.

* * * * *